(12) United States Patent  (10) Patent No.: US 8,519,626 B2
Leshniak  (45) Date of Patent: Aug. 27, 2013

(54) LED NIGHT LIGHT/LED EMERGENCY LIGHT

(75) Inventor: Itai Leshniak, Fair Lawn, NJ (US)

(73) Assignee: Amerlux, Inc., Fairfield, NJ (US)

( * ) Notice: Subject to any disclaimer, the term of this patent is extended or adjusted under 35 U.S.C. 154(b) by 262 days.

(21) Appl. No.: 13/038,224

(22) Filed: Mar. 1, 2011

(65) Prior Publication Data

US 2012/0112641 A1 May 10, 2012

Related U.S. Application Data

(60) Provisional application No. 61/410,977, filed on Nov. 8, 2010.

(51) Int. Cl.
*H05B 37/00* (2006.01)
(52) U.S. Cl.
USPC .............................. 315/86; 315/186; 315/291
(58) Field of Classification Search
USPC ................... 315/86, 88, 90, 161, 185 R, 186, 315/192–193, 291, 297, 299
See application file for complete search history.

(56) References Cited

U.S. PATENT DOCUMENTS

| 4,454,452 | A | 6/1984 | Feldstein | |
|---|---|---|---|---|
| 5,539,623 | A | 7/1996 | Gurz et al. | |
| 6,583,571 | B1 * | 6/2003 | Wang | 315/86 |
| 6,663,248 | B2 * | 12/2003 | Hsieh | 362/20 |
| 7,649,323 | B1 * | 1/2010 | Kuhlmann et al. | 315/200 A |
| 7,677,770 | B2 | 3/2010 | Mazzochette | |
| 7,690,802 | B2 | 4/2010 | Higley et al. | |
| 8,076,859 | B1 * | 12/2011 | Knoble et al. | 315/185 S |
| 2008/0084645 | A1 | 4/2008 | Ahmad, Jr. | |
| 2008/0165535 | A1 | 7/2008 | Mazzochette | |
| 2008/0224025 | A1 | 9/2008 | Lyons et al. | |
| 2008/0258628 | A1 | 10/2008 | Higley et al. | |
| 2010/0061076 | A1 | 3/2010 | Mandy et al. | |
| 2010/0109552 | A1 | 5/2010 | Pomponio | |
| 2010/0207777 | A1 | 8/2010 | Woodford | |

FOREIGN PATENT DOCUMENTS

| JP | 2002026263 | 1/2002 |
|---|---|---|
| JP | 2003022896 | 1/2003 |
| JP | 2009123571 | 6/2009 |
| WO | 2009/036948 | 3/2009 |
| WO | 2012064685 | 5/2012 |

OTHER PUBLICATIONS

Written Opinion and International Search Report dated Mar. 2, 2012 for related International Application No. PCT/US2011/059682, corresponding to WO 2012/064685, also cited herein.

* cited by examiner

*Primary Examiner* — Tung X Le
(74) *Attorney, Agent, or Firm* — Day Pitney LLP

(57) ABSTRACT

An LED fixture is disclosed. The fixture includes an LED array having at least one LED, a first LED driver which is a lower intensity driver and a second LED driver which is a higher intensity driver. The LED drivers and the LED array are electrically connected in parallel to each other and the LED drivers are capable of simultaneously and continuously supplying power to each LED in the LED array.

17 Claims, 4 Drawing Sheets

Driver #1 of lower current output will be driving the LED for night light mode.
Driver #2 will drive the LED at full power mode.

Two Power supplies / drivers of different current output connected in parallel to drive one LED / LED array at different light outputs.

LED NIGHT LIGHT/LED EMERGENCY LIGHT

CONTINUITY

This application claims priority to U.S. Patent Application No. 61/410,977, filed on Nov. 8, 2010, which is incorporated herein by reference in its entirety.

BACKGROUND OF THE DISCLOSED EMBODIMENTS

1. Field of the Disclosed Embodiments

The disclosed embodiments relate to emergency, night and alternative lighting configurations with the use of LEDs (light emitting diodes).

2. Description of the Related Art

Emergency lighting is a requirement for business or public space. Such lighting can be provided using, for example, typical "bug eye" head emergency light fixtures. An example is EL-STBE by the Exit Light Company, 1497 Poinsettia Ave, Suite 154, Vista, Calif., USA. However, such systems are heavy, unattractive, and require use-restricted or dedicated power circuits.

Alternatively, LED overhead lighting can be used as emergency lighting. Such would be obtained using, for example, drivers manufactured by Bodine, which is a division of Philips Electronics North America Corporation, located at P.O. Box 460, Collierville, Tenn., USA. As is known in the industry, an LED driver is a self-contained power supply that has outputs matched to the electrical characteristics of an LED fixture containing at least one LED. Drivers typically are current-regulated so as to deliver a consistent current over a range of load voltages. Drivers may also offer dimming by using pulse width modulation (PWM) circuits or current reducing, controlled by a number of known ways.

With the Bodine drivers, when normal power fails, the emergency drivers, which work in conjunction with an AC LED-driver, switches into "emergency" mode, operating the LEDs for a code-compliant 90 minutes. When AC power is restored, the battery powered drivers automatically return to the charging mode. For example, the Bodine BSL17C-C2 Emergency LED Driver, which is wired though a conduit, supports a lighting load up to 7 Watts (W) at a rated current of 270 milliamps (mA) maximum for a minimum of 90 minutes.

A limitation with this configuration is that the driver is required to operate by disengaging the primary power supply and running off an attached power supply for a duration of 90 minutes. Therefore, there is no ability to simultaneously operate both drivers and increase the intensity of the LED fixture as may be desired. There is also no ability to use this emergency driver to operate independently to provide night lighting. In addition, should any individual emergency power supply fail, the respective light would fail as well. Furthermore, when time comes to test or replace an individual emergency battery, extensive amount of work would be required to access the battery, which may be sealed behind a ceiling structure, such as drywall or sheetrock.

Dimming of an LED array in a fixture, so as to obtain a night light, as indicated, can be accomplished via a dimmer. However, there may be a decreased power factor due to the operation of the dimmer and loss in efficiency. The power factor loss results in a financial loss as well as efficiency losses due to the use of a high output power supply to supply a relatively small current.

SUMMARY OF THE DISCLOSED EMBODIMENTS

An LED fixture is disclosed. The fixture includes an LED array having at least one LED, a first LED driver which is a lower intensity driver and a second LED driver which is a higher intensity driver. The LED drivers and the LED array are electrically connected in parallel to each other and the LED drivers are capable of simultaneously and continuously supplying power to each LED in the LED array.

BRIEF DESCRIPTION OF THE FIGURES

In the accompanying figures, which are not indented to limit the scope of the invention, illustrate the following.

DETAILED DESCRIPTION OF THE DISCLOSED EMBODIMENTS

Figure 1:
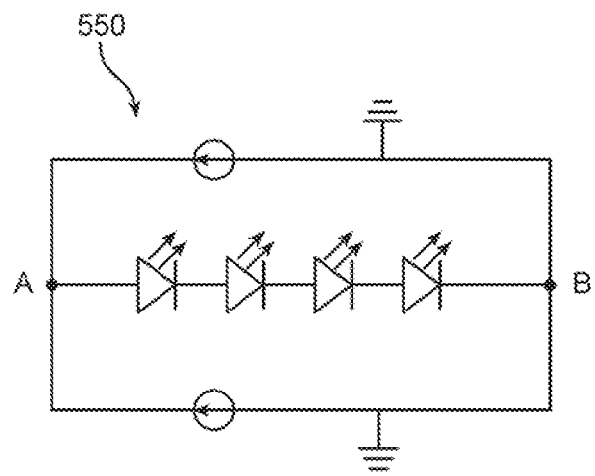
FIG. 1 illustrates an arrangement of LEDs according to an embodiment of the invention.

An advantage of the disclosed embodiments is the capability of providing low level LED lighting without the need for dimmers, without the need for complex controls or automation and without the requirement for many dedicated DC power sources to provide emergency lighting solutions. This is obtained by running an LED array in any one fixture off of two LED drivers, connected in parallel.

An example of the main driver is LP1020-24-C0700 and an example of the secondary driver is LP1020-24-C0350, both from MagTech Industries Corp., 5625-A S. Arville, Las Vegas, Nev., USA. Each driver is designed to operate in a constant-current mode, with a maximum output power of 20 W, designed by the "20" in the model number, and an available output voltage of 12-24 V(DC), designed by the "24" in the model number. In addition, the C0700 model produces a constant current of 700 mA and the 0350 model produces a constant current of 350 mA.

It is to be appreciated that when more than one LED fixture is provided, each would have a primary driver and a secondary driver. Each primary driver would ideally be connected in parallel with each other primary driver for purposes of current division, as with known installations to form a primary driver circuit, and connected to the power grid. Similarly, each secondary driver would be connected in parallel with each other secondary driver, to form a secondary driver circuit which is separate from the primary driver circuit. The secondary driver circuit may be connected to the power grid directly or via an uninterruptible power supply (UPS) or can be connected to an auxiliary power supply, discussed below. In each fixture, however, each primary driver and each secondary driver would be connected together in parallel, as discussed below.

In addition, for reasons discussed below, the current provided by the more powerful primary driver will likely be set to provide a constant output in the range of, for example, 1.1-1.5 Amps (A), and for example 1.2 A. In contrast, the current in the less powerful driver will likely be set to provide a constant output of 50-400 mA. For example, the low level driver would be set to provide 200 mA of constant current if used as a power source for emergency lighting and set to provide 100 mA if used as a power source for night lighting.

That is, according to the disclosed embodiments, the low level driver is used for one purpose, to provide night lighting or to provide emergency lighting. Accordingly, the low level driver can serve its purpose without the need to incorporate a dimmer in the low power circuit. For this reason, the low level driver, when utilized for emergency lighting, would need to be more powerful than when used for night lighting, based on code compliant illumination.

It is to be further appreciated that if one wanted to have both emergency and night lighting, one could provide plural drivers, one acting as a main driver, one acting as a night light driver, and one acting as an emergency light driver, where all are connected in parallel, e.g., at the nodes across the LED array, disclosed below. The lower two drivers would run during night light operations and the middle driver would also be configured to run during an emergency operation. However, for the remainder of this discussion, only a two driver configuration will be discussed.

The typical configuration for one of these fixtures with an LED array is illustrated in FIG. 1. In FIG. 1, the array in the fixture contains four LEDs connected in series. However, more or fewer LEDs can be connected, depending on the power provided by each LED in the fixture. For example, if 16 Watts (W) of power are desired for the proper luminosity from the fixture, such power may be obtained through one or a plurality of LEDs, depending on the power rating for each LED.

As can be appreciated, with the LEDs in the array connected in series between nodes A-B, the current through each LED will be constant. When connecting two drivers (current sources) in parallel, the total current $i_T$ through the LED array is the sum of the primary source $i_P$ and the secondary source $i_S$, that is $i_T=i_P+i_S$. For example, if the primary driver is a 1.2 A driver and the secondary driver is a 200 mA driver, at low output, with the primary driver turned off, only the 200 mA driver drives the LED array. Under such conditions, the LED array senses 200 mA. On the other hand, when the two drivers are on, the LED array senses 1.4 A, which is the sum of current from the two drivers.

Regarding the power output from the fixture, operating in a first mode which is a full power mode, and both drivers running simultaneously, with minimal voltage drop across the LEDs, and 12 volts provided by each of the drivers, the LEDs could ideally consume 12 v×1.4 A=16.8 W. However, considering typical power losses to run the drivers, the full power consumption of the fixture, including that of the drivers, would be closer to 20 W. On the other hand, if operating at a second mode which is low power mode, that is, if the low level driver were used for emergency lighting, with the low level driver providing 200 mA, the LED array would ideally consume 12 v×0.2 A=2.4 W. Again, considering typical power losses to run the driver, the power consumption of the fixture, including that of the driver, would be closer to 2.5-3.0 W, creating a light output that falls within code compliance for many states.

Further, if the low level driver were used for night lighting rather than emergency lighting, with the low level driver providing 100 mA, the LED array would ideally consume 12 v×0.1 A=1.2 W. This would provide pleasant illumination for a business, such as a department store, or as orientation light when full light is not desired during overnight hours or in closed spaces. If the store has a glass storefront, such lighting would provide added security as well as continued exposure/advertising of the items within the store.

What has been demonstrated by this example is that the LED array can provide lower output for night and emergency lighting without the need of a dimmer and without the associated dimmer power losses. In addition, as indicated, the light output of the "low light" configuration can be any desired power output, from 0.1% up to 50% of the full power, depending on the one-time adjustment of the output current from the respective drivers. A constant application of dimmers is not required.

As mentioned, for emergency lighting, the circuit connecting the low level drivers to a power supply would need to run off of some type of UPS. Consider where, for example, 100 LED fixtures were disposed in a department store and each needed to provide 2.5 W of power based on code minimum lighting requirements. Such could be obtained by running all of the low level drivers off of a single 250 W, AC driven, UPS. Such a configuration would include an off the shelf inverter so as to convert DC (battery) power to AC (alternating current) power. One sample inverter is the 250 Watt Bodine ELI series emergency light inverter.

It is to be appreciated that this configuration would power 100 LED fixtures at approximately 2.5 W each (2.5 W/LED× 100 LEDs=250 W), less the power required to run the low level driver. This is a significant improvement for an emergency lighting configuration over, for example, powering at most 15 LED fixtures at 16 W (full power) using the same 250 W power supply (15 LEDs×16 W/LED=250 W). Such limitations would be created if the UPS was instead powering the primary driver and the secondary power loop was not included, as with prior art configurations.

The disclosed emergency mode embodiment, which is a lower power mode, is also an improvement over the configuration which requires emergency drivers which are individually battery operated on each LED fixture. This is because there is only a need for a single conveniently locatable and replaceable UPS. The advantages are clear when comparing with the need to change over 100 individual emergency power supplies, one located at each fixture, as disclosed in the prior art configurations. In addition, as a consequence of the disclosed embodiments, ample emergency lighting can replace the aforementioned "bug eye" emergency lighting.

As indicated, though dimmers may be desirable with the primary driver under certain normal conditions, dimmers are not required for either emergency lighting or night lighting. This is beneficial because the use of dimmers is less accurate than the drivers delivering a constant current. Furthermore, complex dimmers required to automatically adjust the power for emergency purposes can be prone to operational challenges. Moreover, the power factor using the constant output drivers is much better than with a dimmer, providing immediate financial savings on installation and maintenance cost.

One skilled in the emergency lighting art would be aware of the fact that known applications which may have more then one power feed are configured to power different fixtures, not the same fixtures. For example, office florescent in emergency mode may utilize half of the distributed florescent lighting this way. As indicated, a relatively small number of lights would quickly utilize the full power output from a known UPS implementation. In comparison, with the disclosed embodiments, the same LEDs are utilized to provide all intensity levels, including the emergency levels.

The circuit connecting the secondary drivers can be powered from an alternative power source, such as a solar cell, while the circuit connecting the primary drivers can be connected to the power grid. For example, a solar cell of 250 W in a residential home can be installed for, as an example, a thousand dollars. One such panel is the Canadian Solar CS6P-

230P 230 watt Solar Module, available through ECO Distributing LLC, 7707 E. Acoma Dr., Ste 109, Scottsdale, Ariz., USA. With 60 LED figures in a home, power from the solar cell can deliver 4 W to each LED fixture (60 LEDs×4 W/LED=240 W) so that the LED fixtures can run as long as power is supplied from the solar panel. When more power is needed, 12 W can be obtained using the main, drivers connected to the main power supply on the power grid. This configuration satisfies requirements in California, USA, where lights must be turned down when a room is unoccupied. With the installation of a solar cell, one obtains solar powered "stand by" light.

Figure 2:
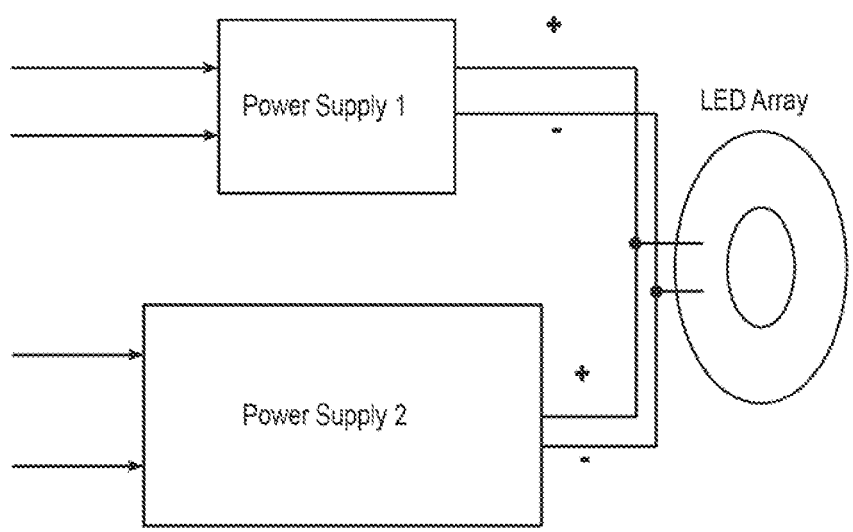
FIG. 2 illustrates the basic concept for the disclosed embodiments.

Turning back to the accompanying figures, FIG. 2, titled "abstract," is the basic concept for the disclosed embodiments. While one fixture is illustrated in each slide, each fixture in an array of fixtures would be configured similarly as referenced herein. The slide illustrates two drivers (labeled "power supply") of different current outputs connected in parallel to drive an LED fixture, which includes at least one LED to produce the desired wattage, and to ultimately provide different light outputs depending on the lighting mode.

On the right of each driver is a positive lead and a negative lead, where the positive lead provides power to the LED fixture. On the left side of each driver are leads illustrating connections for each respective driver which may run directly to a power source, such as the power grid. On the other hand, where plural fixtures are provided, the leads leaving any one high powered driver would connect with the high powered drivers from the other respective fixtures when returning to the power source. This would form the above mentioned high power circuit, as with typical multi-fixture connections.

Similarly, with plural fixtures, the leads leaving any one low powered driver would connect with the low powered drivers from the other respective fixtures when returning to the power source. This would form the above mentioned low powered circuit. Accordingly, the only electrically connecting junctions for the high powered and lower powered circuits are at each respective LED fixture, as indicated. The power source for the high powered driver circuit may be a 277 V source and the power source for the low power driver circuit may be a 120 V source.

Figure 3:
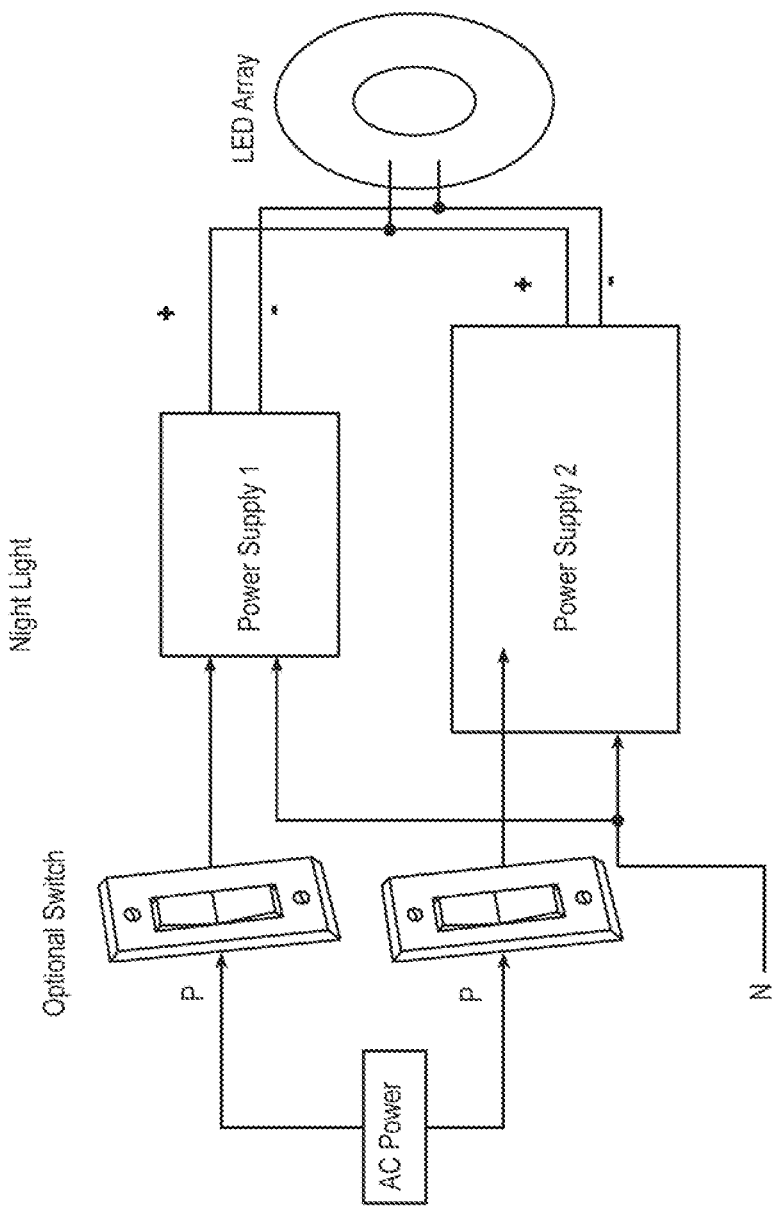
FIG. 3 is an augmented embodiment as compared with FIG. 2.

FIG. 3, titled "Night Light," is an augmented embodiment as compared with FIG. 2. Here, driver #1, providing lower current, will drive the LED for night. Driver #2, providing higher current, will drive the LED at full power mode, for example, providing normal lighting. First and second optional switches are provided in this embodiment to independently operate the respective drivers or driver circuits. In addition, the high and lower powered driver circuits are both AC powered so that the drivers are connected to a common neutral conductor (N).

Figure 4:
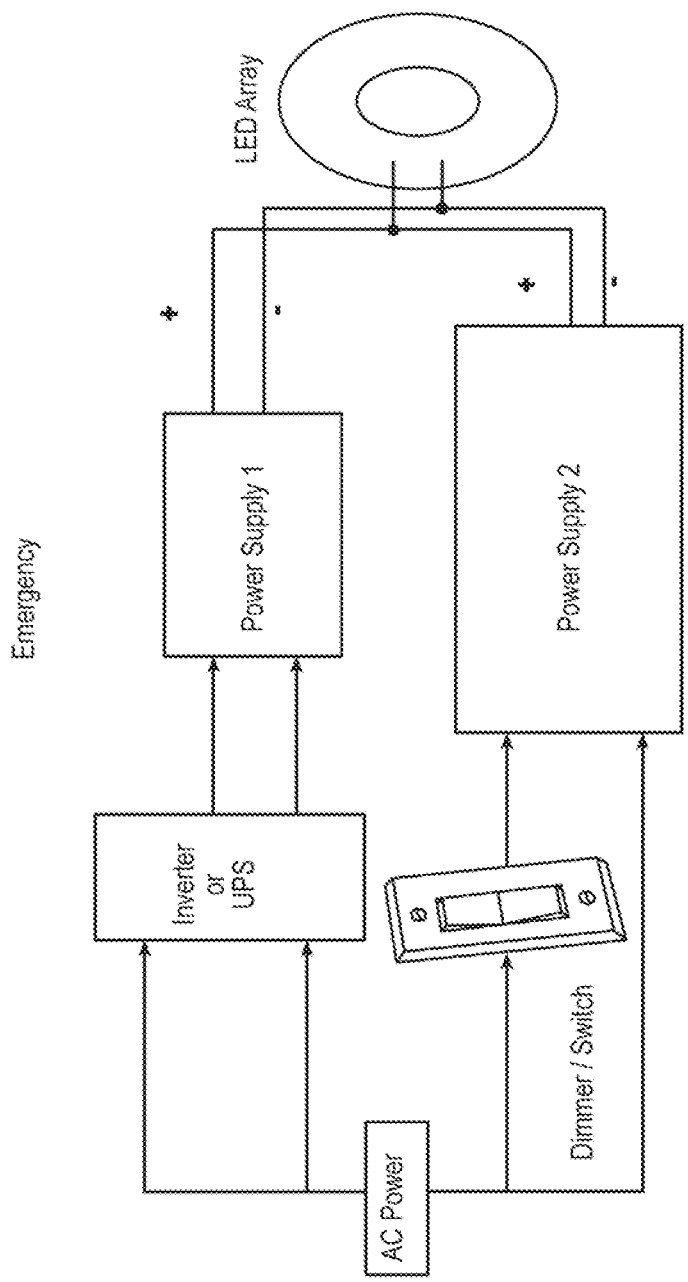
FIG. 4 illustrates a configuration in which a driver, providing lower power, is connected to a UPS to supply light output in emergency mode.

In FIG. 4, titled "emergency," driver #1, providing lower power, is connected to a UPS to supply light output in emergency mode. Driver #2, providing higher power, will be connected to the grid power to supply full light output and can optionally be controlled by a dimmer, which may be desirable. However, a dimmer programmed or controlled to adjust the lighting for emergency conditions is not required.

Figure 5:
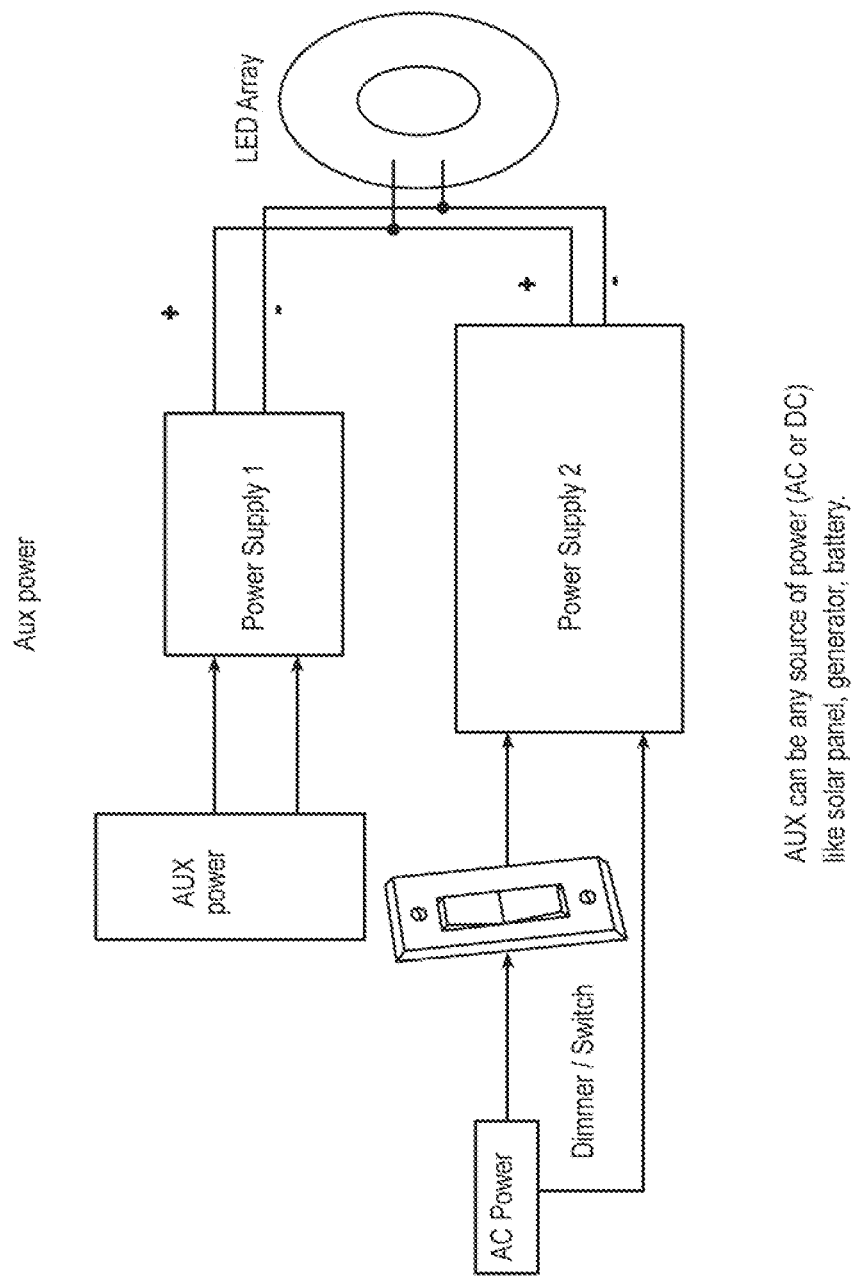
FIG. 5 illustrates an auxiliary power supply for powering the low power secondary driver.

FIG. 5, titled "Aux Power" illustrates an auxiliary power supply for powering the low power secondary driver, driver #1. The aux power supply can be any source of power (DC or AC) such as a solar panel, a generator, a battery, etc. For example a battery powered power source as the LED driver is the CC4036 series low voltage driver, available from MagTech. Again, driver #2, providing higher current, will be connected to the grid power to supply full light output.

While not illustrated, a third driver loop or additional driver loops could be included so that, for example, instead of a single high power driver, plural drivers would operate as the single high power driver, which can be switched on and off together. The same type of configuration option applies for the lower power driver. Alternatively, more than two low power modes could be obtained with the use of a plurality of driver loops. That is, one low power driver could be designated for night lighting mode while another low power driver could be designated for an emergency lighting mode.

The above disclosure is not considered limiting. That is, for example, each of the numerical examples of current, voltage and wattage are provided merely for illustrating possible applications of the disclosed embodiments, while other combinations fall within the scope of the disclosure.

I claim:

1. A light emitting diode (LED) fixture, comprising:
a plurality of LED drivers, each LED driver having a plurality of output terminals, wherein output terminals of the plurality of LED drivers having the same polarity are connected in parallel with each other; and
at least one LED operably coupled to the plurality of LED drivers,
wherein at least two of the LED drivers in the plurality of LED drivers are configured to energize the at least one LED by (i) operating independently from one another in a first mode of operation and (iii) by operating simultaneously in a second mode of operation.

2. The LED fixture of claim 1, wherein a first LED driver in the plurality of LED drivers is configured to power the at least one LED from an electric grid, and a second LED driver in the plurality of LED drivers is configured to power the at least one LED from a second power supply.

3. The LED fixture of claim 2, wherein the second power supply includes an inverter.

4. The LED fixture of claim 2, wherein the second power supply includes an uninterruptible power supply.

5. The LED fixture of claim 2, wherein the second power supply includes an auxiliary power supply.

6. The LED fixture of claim 5, wherein the auxiliary power supply includes at least one of a solar panel, a generator, and a battery.

7. The LED fixture of claim 1, wherein each of the LED drivers is configured to produce a pre-determined output current.

8. The LED fixture of claim 1, wherein the plurality of the LED drivers includes:
a first LED driver configured to produce a first power output at a first output current for powering the at least one LED; and
a second LED driver configured to produce a second power output at a second output current that is substantially lower than the first output current for powering the at least one LED.

9. The LED fixture of claim 8, wherein the second output current of the second LED driver is in a range from 0.1 to 50% of the first output current of the first LED driver.

10. The LED fixture of claim 8, wherein the first LED driver and the second LED driver are configured to energize the at least one LED by operating simultaneously.

11. The LED fixture of claim 8, wherein the first LED driver and the second LED driver are configured to energize the at least one LED by operating using one of these LED drivers at a time.

12. The LED fixture of claim 8, further comprising a dimmer operably coupled to the fixture for adjusting the first output current of the first LED driver.

13. The LED fixture of claim 8, further comprising an on/off switch adapted to selectively prevent the flow of electrical power to the first LED driver.

14. The LED fixture of claim 8, further comprising an on/off switch adapted to selectively prevent the flow of electrical power to the second LED driver.

15. The LED fixture of claim 8, wherein the first LED driver is powered by an electric grid.

16. The LED fixture of claim 8, wherein the second LED driver is powered by an electric grid.

17. The LED fixture of claim 8, wherein the first LED driver and second LED driver are powered by an electric grid.

* * * * *